United States Patent
Rietz et al.

(10) Patent No.: US 6,598,984 B2
(45) Date of Patent: Jul. 29, 2003

(54) LIGHTWEIGHT MIRROR AND METHOD OF MAKING

(75) Inventors: Ronald M. Rietz, Rochester, NY (US); Roger J. Dahl, Hilton, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/246,167

(22) Filed: Sep. 18, 2002

(65) Prior Publication Data
US 2003/0016456 A1 Jan. 23, 2003

Related U.S. Application Data

(63) Continuation of application No. 08/795,923, filed on Feb. 5, 1997, now abandoned.

(51) Int. Cl.[7] .............................. G02B 7/195; G02B 5/08
(52) U.S. Cl. ........................ 359/845; 359/838; 359/848
(58) Field of Search ................................. 359/845, 848, 359/838; 428/912.2

(56) References Cited

U.S. PATENT DOCUMENTS

| | | | |
|---|---|---|---|
| 2,988,959 A | 6/1961 | Pelkey et al. ............... 428/116 |
| 3,514,275 A | 5/1970 | Bray .......................... 65/33.5 |
| 3,644,022 A | 2/1972 | Jagdt et al. ................. 359/848 |
| 3,754,812 A | 8/1973 | Mohn .......................... 359/848 |
| 3,912,380 A | 10/1975 | Klein .......................... 359/848 |
| 4,214,818 A | * 7/1980 | Choyke et al. ............. 359/845 |
| 4,378,626 A | * 4/1983 | Eitel ........................... 29/527.2 |
| 4,410,394 A | * 10/1983 | Stalcup et al. ................ 216/24 |
| 4,431,269 A | * 2/1984 | Barnes, Jr. .................. 359/845 |
| 4,466,700 A | 8/1984 | Christiansen et al. ....... 359/848 |
| 4,555,872 A | * 12/1985 | Yie .............................. 451/40 |
| 4,692,367 A | * 9/1987 | Richter ....................... 428/116 |
| 4,710,332 A | * 12/1987 | Rosman | |
| 4,772,110 A | * 9/1988 | Roszhart .................... 359/845 |
| 4,913,953 A | * 4/1990 | Prewo et al. ............... 428/131 |
| 4,917,934 A | * 4/1990 | Sempolinski ............... 428/116 |
| 4,940,675 A | 7/1990 | Bohlayer et al. ............. 501/12 |
| 5,071,596 A | 12/1991 | Goela et al. ............... 264/1.21 |
| 5,076,700 A | 12/1991 | DeCaprio ................... 359/848 |
| 5,157,556 A | 10/1992 | Hugenell .................... 359/849 |
| 5,312,693 A | * 5/1994 | Paul ........................... 428/554 |
| 5,477,393 A | 12/1995 | Sasaki et al. ............... 359/843 |

* cited by examiner

*Primary Examiner*—John Juba
(74) *Attorney, Agent, or Firm*—Thomas H. Close

(57) ABSTRACT

A lightweight mirror structure is formed from a unitary body of mirror blank material by using an abrasive water jet cutting apparatus to cut a plurality of cylindrical channels in the blank between and extending parallel to the mirror surface and the back surface of the mirror structure. The process may be employed to quickly produce inexpensive lightweight mirror structures.

7 Claims, 3 Drawing Sheets

LIGHTWEIGHT MIRROR AND METHOD OF MAKING

CROSS-REFERENCE TO RELATED APPLICATIONS

This is a continuation of application Ser. No. 08/795,923, filed Feb. 5, 1997 by Ronald Rietz et al., entitled Lightweight Mirror and Method of Making now abandoned.

FIELD OF THE INVENTION

The invention relates generally to the field of optics, and in particular to reflective optical elements in optical systems such as telescopes. More specifically, the invention relates to the design of lightweight reflective optical elements.

BACKGROUND OF THE INVENTION

Lightweight optical mirrors used for focusing light rays in optical systems such as telescopes are well known. One approach to achieving light weight in such mirrors is to provide a honeycomb core structure behind the reflective optical surface of the mirror. See, for example, U.S. Pat. No. 3,644,022 issued Feb. 22, 1972, to Jagdt et al. which shows a lightweight optical element having a honeycomb support structure fused to the back of a relatively thin front plate. The honeycomb structure has walls extending generally perpendicular to the optical surface of the front plate. A major shortcoming of this type of construction is that it is relatively high cost and includes the assembly of a number of precision parts. The construction process may be subject to difficulty during the thermal heating and cooling cycles employed to fuse the mirror components, resulting in incomplete joining of the components and residual thermal stresses. The thermal cycles may also change the thermal properties of the mirror elements, resulting in loss of thermal stability during use of the finished mirror. Furthermore, the conventional lightweight mirror manufacturing methods require relatively long lead time for the elements of the mirror.

There is a need therefore for an improved mirror structure that avoids the problems noted above with respect to prior art lightweight mirror structures.

SUMMARY OF THE INVENTION

The present invention is directed to overcoming one or more of the problems set forth above. Briefly summarized, according to one aspect of the present invention, a lightweight mirror structure is formed from a unitary body of mirror blank material by using an abrasive water jet cutting apparatus to cut a plurality of cylindrical channels in the blank between and extending parallel to the mirror surface and the back surface of the mirror structure. The process may be employed to quickly produce inexpensive lightweight mirror structures.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the advantages of being able to rapidly produce a lightweight mirror structure in a fraction of the time at a fraction of the cost of the prior art methods. The method uses only a single piece of starting material and therefore avoids the materials handling costs of the prior art methods employing multi-piece constructions. The resulting mirror structure is relatively free from manufacturing induced stresses without the need for annealing cycles, and is structurally sound due to the unitary construction.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
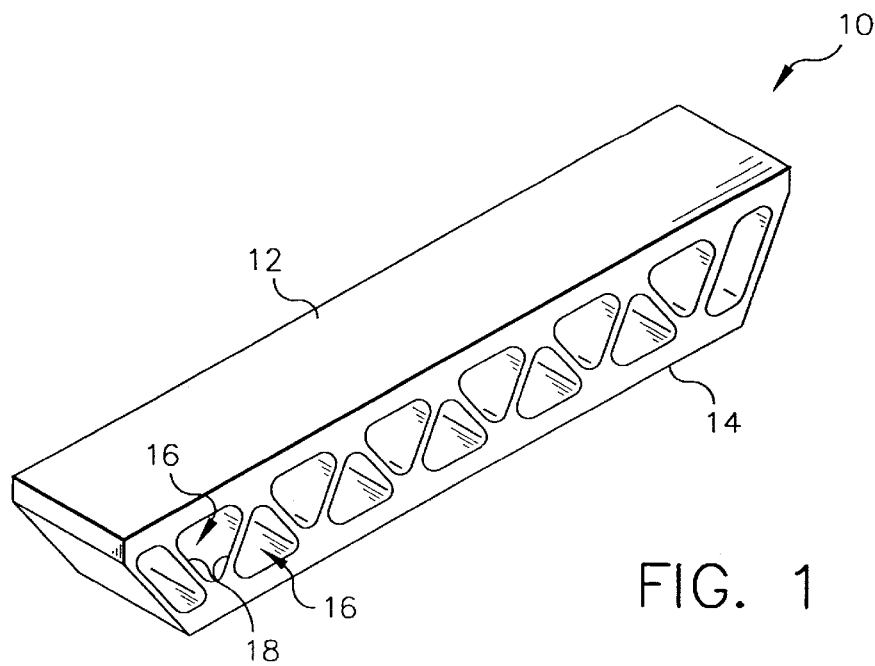
FIG. 1 is a perspective view of a rectangular mirror structure having triangular channels according to the present invention.

Referring to FIG. 1, a lightweight mirror 10 according to the present invention is constructed from a unitary blank, and includes an optical reflective surface 12 and a back surface 14. A plurality of cylindrical channels 16 extend through the unitary blank generally parallel to the optical reflective surface 12 and the back surface 14. The walls 18 between the channels structurally connect the optical reflective surface 12 of the mirror 10 to the back surface 14. The dimensions and orientations of the walls 18 are selected according to the application planned for the mirror, taking into account the inertial and structural loads that will be applied to the mirror during use. A suitable material for the unitary blank is Ultra Low Expansion (ULE®) glass, an-ultra-low expansion titanium silicate glass having a coefficient of thermal expansion of 0±30 ppb/° C. over a temperature range of 5–35° C., available from Corning Incorporated, Corning, N.Y. Alternatively, the mirror can be constructed of a metal such as aluminum. Other materials which are used for making mirrors, such as silicon carbide, may also be used.

Figure 2:
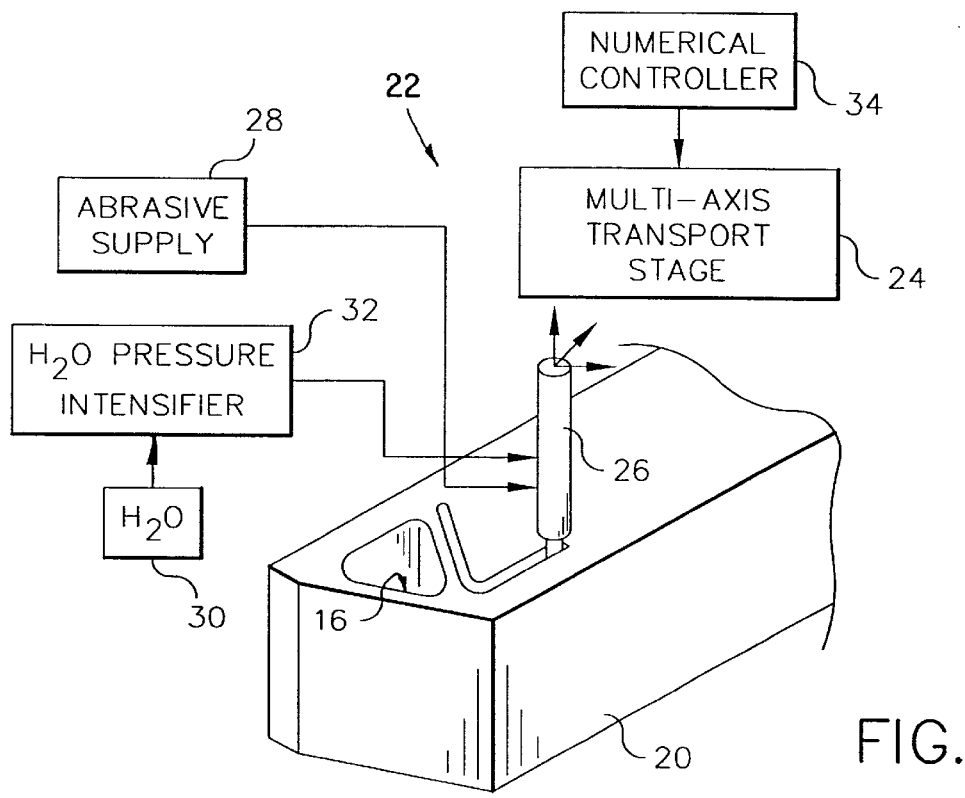
FIG. 2 is a schematic illustration of the water jet cutting apparatus employed in the present invention.

Referring to FIG. 2, one method of manufacturing the lightweight mirror of the present invention is by abrasive water jet cutting. A pre-formed blank 20 of material, such as ULE glass having the general shape of the mirror is placed in an abrasive water jet cutting apparatus 22. The water jet apparatus 22 includes a multi-axis transport stage 24 that carries a water jet nozzle 26 that can be moved relative to the pre-formed mirror blank 20 by the stage 24. The nozzle 26 has an orifice 0.040 inches in diameter and is supplied with an abrasive, such as 80 mesh garnet from an abrasive supply 28, and high pressure water from water supply 30 pressurized by a pressure intensifier 32. The water is supplied to the nozzle 26 at 50,000 psi at 10 gallons/minute. A numerical controller 34 is programmed to drive the nozzle 26 in a pattern that cuts the channels 16 in the blank 20. A suitable abrasive water jet cutting system can be obtained from Flow International, Seattle, Wash.

Alternative methods may be employed to form the channels in the mirror. For example, the channels may be formed by diamond machining, abrasive water jet machining (as compared to abrasive water jet cutting described above), electro-discharge machining (EDM), casting with the channels in place (such as reaction bonded silicon carbide), or chemical vapor deposition on a suitably shaped mandrel.

Figure 3:
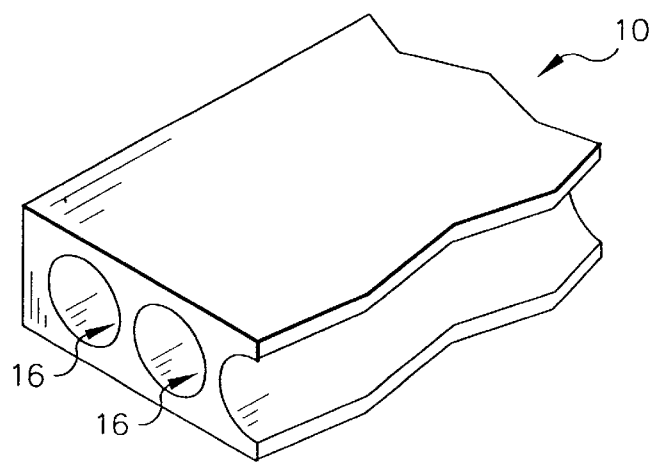
FIGS. 3–5 are partial perspective views of alternative mirror structures according to the present invention.
Figure 4:
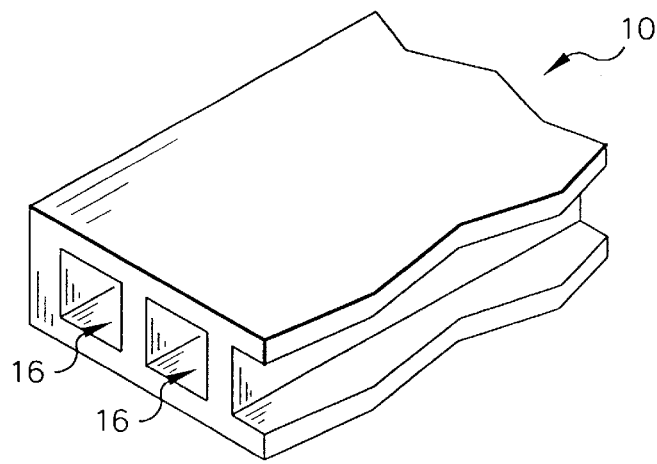
Figure 5:
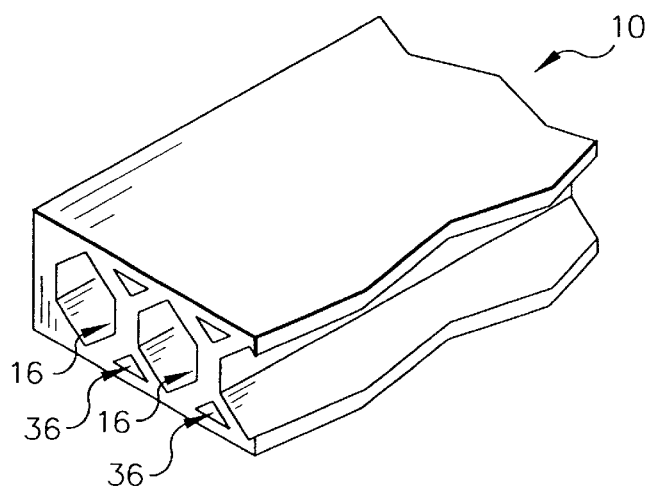

Referring to FIGS. 3–5, the channels 16 in the mirror 10 may have various alternative cross sectional shape, such as ellipsoidal (e.g. circular), or polygonal (e.g. rectangular, or hexagonal), respectively. Various cross sectional shapes in the channels may be employed in one mirror, as illustrated by the additional triangular channels 36 shown in FIG. 5.

Figure 6:
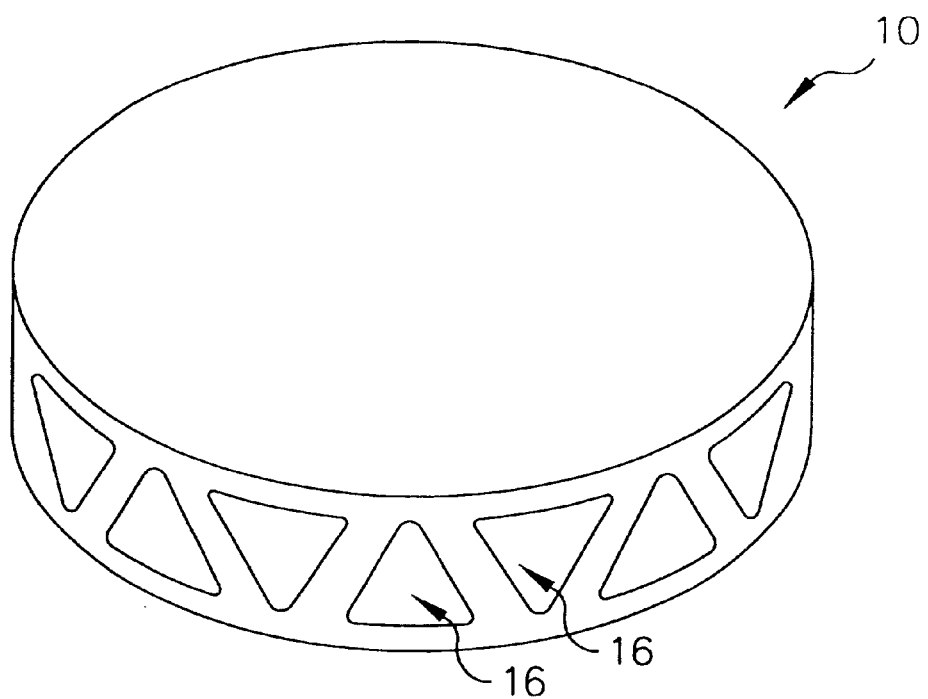
FIG. 6 is a perspective view of a circular mirror having triangular channels according to the present invention.

Although the mirrors described above have a rectangular mirror surface, other shapes, such as round mirrors, as shown in FIG. 6 having channels that are generally parallel to the surface may be constructed by machining from a round pre-formed blank, or by machining the desired final mirror shape from a rectangular blank, after forming the channels, for example by using a diamond cutting apparatus.

The invention has been described with reference to a preferred embodiment. However, it will be appreciated that variations and modifications can be effected by a person of ordinary skill in the art without departing from the scope of the invention.

Parts List 10 lightweight mirror
12 optical reflective surface
14 back surface
16 channels
18 walls
20 pre-formed blank
22 abrasive water jet cutting apparatus
24 multi-axis transport stage
26 nozzle
28 abrasive supply
30 water supply
32 pressure intensifier
34 numerical controller
36 triangular channels

What is claimed is:

1. A reflective mirror structure comprising a unitary body of an ultra-low expansion titanium silicate glass having a coefficient of thermal expansion of 0±30 ppb/° C. over a temperature range of 5–35° C., the unitary body having an optical reflective surface, and a back surface opposite the reflective surface and coextensive in size to the optical reflective surface, and defining a plurality of cylindrical channels extending all the way through the body parallel to the optical reflective surface and the back surface.

2. The mirror structure claimed in claim 1, wherein the cylindrical channels are generally triangular in cross section.

3. The mirror structure claimed in claim 1, wherein the cylindrical channels are generally rectangular in cross section.

4. The mirror structure claimed in claim 1, wherein the cylindrical channels are generally circular in cross section.

5. The mirror structure claimed in claim 1, wherein the cylindrical channels are generally hexagonal in cross section.

6. The mirror structure claimed in claim 1, wherein the optical reflective and back surfaces are rectangular.

7. The mirror structure claimed in claim 1, wherein the optical reflective and back surfaces are circular.

* * * * *